J. BUCHEK.
SAFETY VALVE MECHANISM AND PRESSURE GAGE.
APPLICATION FILED MAR. 26, 1917.
1,308,037.
Patented July 1, 1919.
2 SHEETS—SHEET 2.
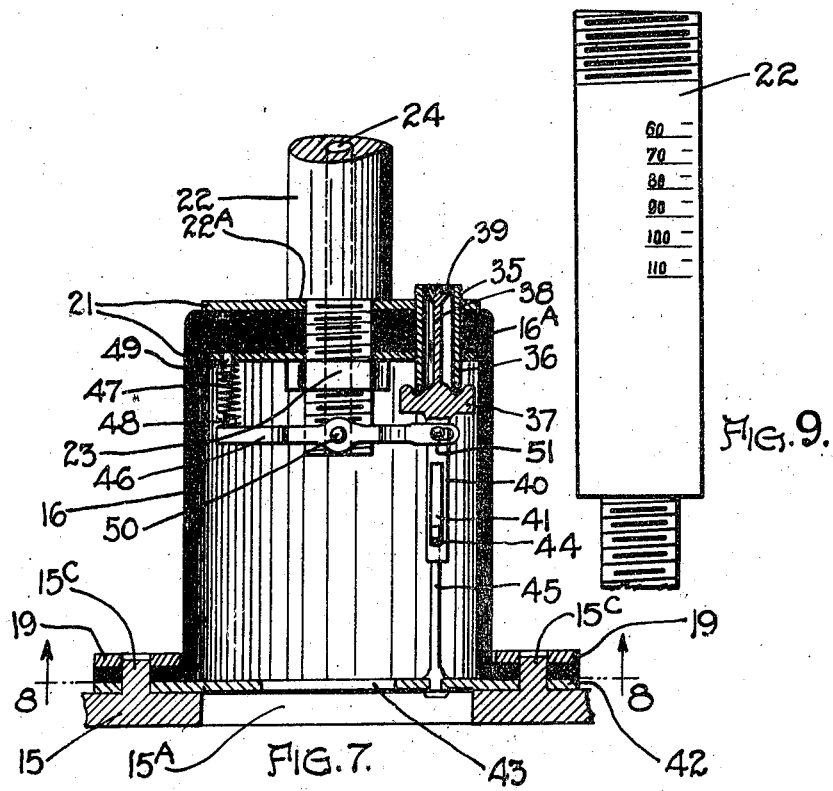
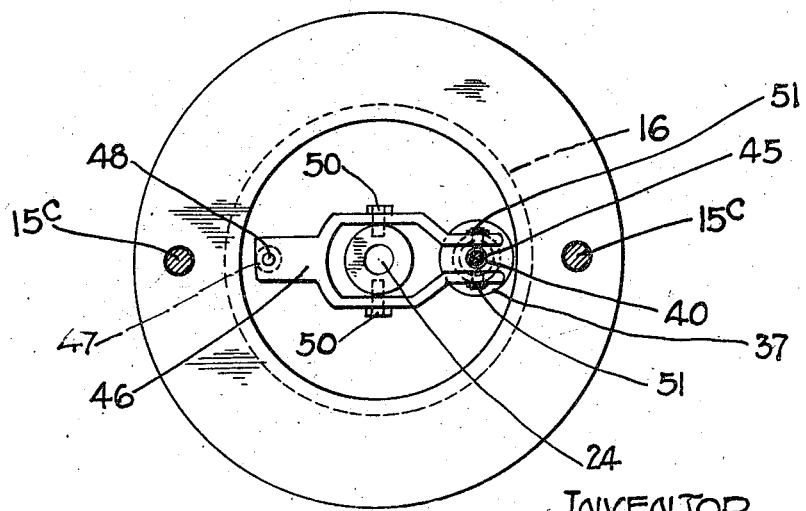
INVENTOR.
Joseph Buchek
By
Frank J Schnaider Jr
Attorney.

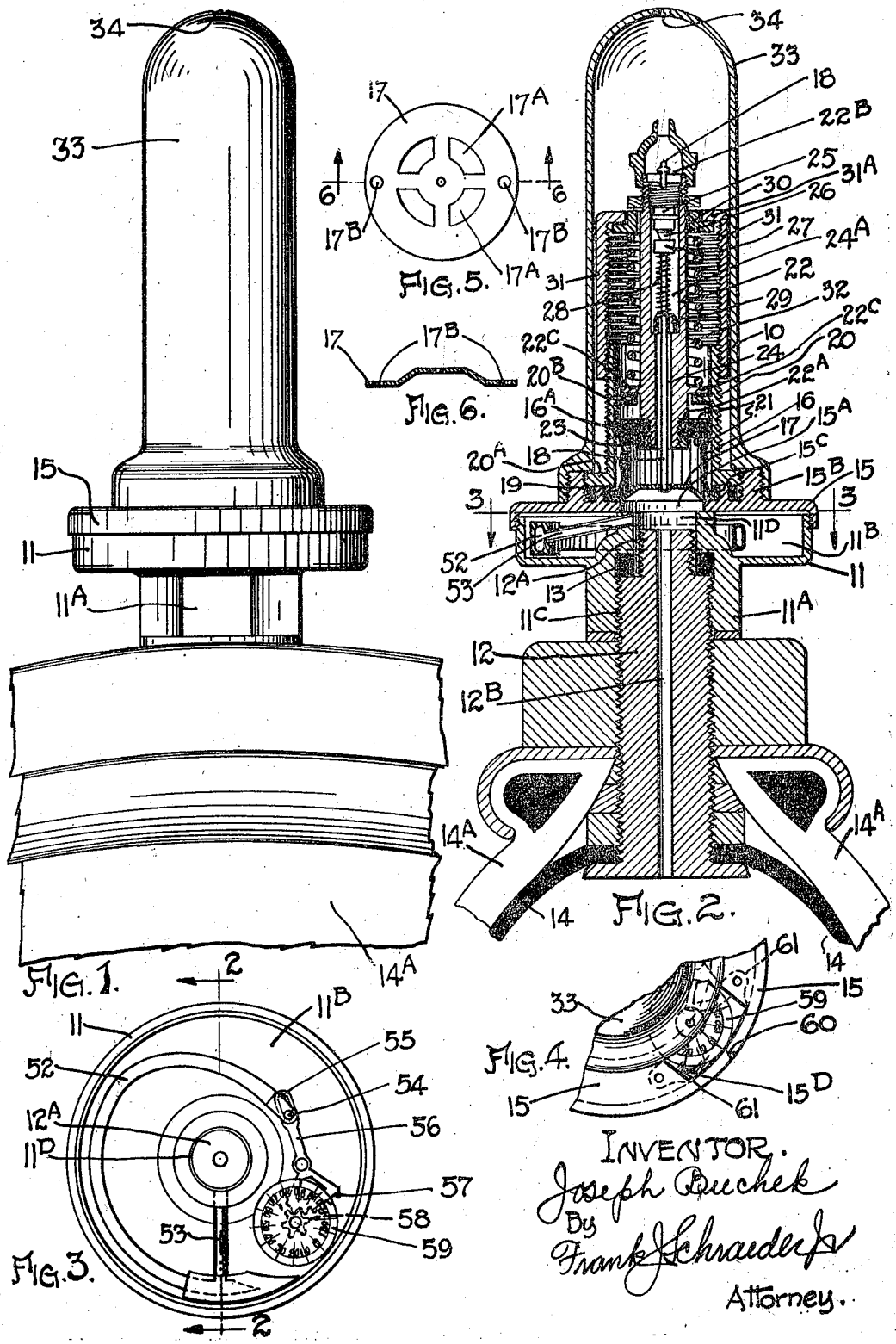

UNITED STATES PATENT OFFICE.

JOSEPH BUCHEK, OF OAK PARK, ILLINOIS.

SAFETY-VALVE MECHANISM AND PRESSURE-GAGE.

1,308,037.

Specification of Letters Patent.

Patented July 1, 1919.

Application filed March 26, 1917. Serial No. 157,560.

*To all whom it may concern:*

Be it known that I, JOSEPH BUCHEK, a subject of the Emperor of Austria, residing in Oak Park, county of Cook, and State of Illinois, have invented a certain new and useful Improvement in Safety-Valve Mechanism and Pressure-Gages, of which the following is a specification.

This invention relates generally to safety-valves and more particularly to safety-valves for pneumatic tires and the like, and has among its objects the production of a novel valve of such character which will prolong the life of pneumatic tires and prevent what is commonly termed as "blow-outs."

Two principal causes underlie the blowing up of pneumatic tires: first, under-inflation, and second, over-inflation.

When an automobile is run with tires under-inflated the sides of the tire are subjected to a greater bending motion, which has a tendency of gradually weakening and breaking the fibers in the material and thereby producing a weakened tire which easily bursts when the air pressure is increased therein.

Also, an over-inflated tire may burst when the air in the tire is sufficiently heated to an excessive air pressure for a weakened portion in the tire.

The principal object of this invention resides in the provision of a safety valve for pneumatic tires, which will automatically exhaust and relieve the pressure in the tire when such pressure has been raised to or above a pre-determined point.

With the above and other objects in view, the invention consists in the details of construction and in the arrangement and combination of parts hereinafter described and particularly pointed out in the appended claims.

In describing the invention in detail, reference will be had to the accompanying drawings, wherein like reference characters denote corresponding parts in the several views, and in which:

Figure 1 is an elevation of my improved mechanism. Fig. 2 is a section taken on line 2—2 of Fig. 3. Fig. 3 is a view of the pressure gage chamber with cover or upper portion removed. Fig. 4 shows a fragmentary view of the pressure gage cover showing the pressure indicator. Figs. 5 and 6 show, respectively, a plan view and cross section taken on line 6—6, of the valve stem retaining member. Fig. 7 shows an enlarged detail showing a modification embodying an auxiliary exhaust valve and operating mechanism, and Fig. 8 is a view taken on line 8—8 of Fig. 7. Fig. 9 is an enlarged portion of the tubular valve member showing graduations indicating points of exhaust.

Referring to the drawings, my invention finds one embodiment in a structure comprising a valve body which is generally indicated by 10 and which body 10 includes the lower member 11 which comprises the interiorly threaded nut portion $11^A$ and the annular pressure gage chamber $11^B$. The interior threads $11^C$ are arranged to engage the usual tire valve stem 12 and a suitable packing 13 is provided for sealing purposes as will be obvious. The upper bore $11^D$ is large enough to clear the narrowed top or cap portion $12^A$ of the stem 12 which is provided with the interior passage $12^B$ communicating with the interior of the tire tube 14 which tube is partly shown in Fig. 2.

The gage chamber $11^B$ has screw connection with the cover portion 15 which is provided with the central opening $15^A$ to permit the passage of air from the open valve stem 12 into the expandible tubular member 16 which may be of rubber or any other suitable expansible material. The top of the cover 15 is cast with a raised ring $15^B$ threaded interiorly and exteriorly. A pair of lugs $15^C$, also cast upon the upper surface of the cover 15, prevent any lateral motion of the disk 17 which disk limits the downwardly extended valve stem 18 in its vertical movement, and is formed with the perforation $17^A$ and the holes $17^B$ for the lugs $15^C$.

It will be seen from the illustrations, (particularly Figs. 2 and 7) that the expandible member 16 has an outwardly extending lower flange which is securely held between the disk 17 and an ordinary circular washer 19 and the exteriorly threaded stationary flanged tube 20 which by virtue of its threaded flange $20^A$ being screwed within the interior threads of collar or ring $15^B$, securely retains the peripheral edge of the lower flange of such expandible member between the disk 17 and washer 19. The upper inwardly extending flange $16^A$ is thickened and is rigidly held between a pair of ordinary washers 21 which washers and the thickened portion $16^A$ are mounted on the $11^C$ lower threaded end of the vertically movable tubular valve member 22 and are confined by the nut 23 and the shoulder 22^A.

The tubular valve member 22 is preferably, centrally mounted with relation to the expandible member 16 and is provided with an interior bore 24 having an upper enlarged portion 24^A containing the common form of check valve 25 which includes the valve seat 26 and the valve 27 mounted on the upper portion of the stem 18. The valve is normally closed by means of spring 28 which is confined between the valve 27 and the metal rest or shoulder 29.

As is well understood, the stem 18 projects normally a little above the orifice or terminal 22^B, which is threaded both interiorly and exteriorly.

An enlarged portion 22^C on the lower portion of the member 22 forms a seat for a coiled spring 32, the upper end of which abuts against the flanged collar 30 which is loosely mounted on the member 22 and which collar 30 is confined beneath the inner flange 31^A of the interiorly threaded tubular member 31 which is screw mounted on the threaded tube 20. Such member 31 it is observed forms means for adjusting and regulating the pressure of spring 32 thereby varying the point of exhaust for the valve 27.

To prevent any crushing of the expandible member 16 by the force of the spring 32, the tube 20 is provided with an inner collar 20^B which supports the enlarged portion 22^C of the valve member 22 and limits the downward movement thereof.

The spring 32 and the various coöperating parts are so proportioned that when the member 31 is screwed downwardly to the proper maximum pressure desired within the tire, which desired pressure will be indicated by reading of the graduations which aline with the top surface 31^B of the member 31, any increase in pressure over such predetermined maximum pressure will raise the tubular valve member 22 and the valve 27 and thereby unseat such valve 27 from the seat 26 to permit an escape of air to release and lower the pressure whereupon the valve 27 will again resume its normal closed position. It will be observed that the unseating of valve 27 is due to the fact that the valve stem 18 is limited in its upward movement by confinement within the disk 17.

In the modified construction of exhaust valve, shown in Figs. 7 and 8, the exhaust of any increased air pressure is through the auxiliary valve generally indicated by 35 which comprises the tubular valve seat 36, the valve 37 which has an upwardly extending stem 38 terminating with finger 39 which guide and maintain the relative central alinement of such valve 37, and seat 36. Extending downwardly from the valve 37 and integral therewith is a tubular portion 40 which is slotted as at 41. A flat washer 42 provided with an opening 43 is provided and substituted for such disk 17 which is used in the above described construction. The opening or exhausting of this valve 35 is also, in this case, accomplished by raising the seat 36 from the valve 37 which is held stationary and limited in its vertical movement by the abutment of the pin 44 with the bottom edge of the slot 41, such pin 44 extending transversely through the upper part of rod 45 which is rigidly mounted to the washer 42 and the upper end of which extends within the tubular portion 40.

To normally positively retain the valve 37 in closed position, I provide the spring pressed lever 46 mounted on pins 50 supported on the lower end of tubular member 22 and which at one end is actuated by the spring 47 which is retained between the lugs 48 and 49. The other end is forked and provided with slotted openings in the ends of such forks through which extend the pins 51 within the top part of member 40.

The pressure gage or indicator which is common to both structures and which is located in the chamber 11^B comprises a well known vibrating pressure tube 52 having direct communication with interior of bore 11^D through the cross tube 53 and carrying the pin 54 at the movable end thereof, which pin 54 extends into the slot 55 of the pivoted lever 56, the other end of which lever 56 forms a segmental rack 57 which operates the pinion 58. The pinion 58 has rigid connection with the indicating dial 59 upon which are circumferentially arranged graduations indicating, by their registration with the fixed arrow 60 on the edge of cover 15, the pressure within the tire tube 14.

The dial 59 is visible through the opening 15^D and transparent cover 61 secured underneath.

A cylinder cap 33 provided with the exhaust opening 34 and having a wide mouth which is interiorly threaded for screw-connection with the portion 15^B of cover 15, incloses the upper interior valve parts for protection from dust, water and other elements which might hinder the efficient operation.

I claim:

1. A valve mechanism comprising a valve body, a vertically movable tubular valve member within the body, an expandible member connected to the valve member and to the body, a valve in said valve-member, a valve stem connected to the movable part of said valve, and a disk underlying one end of the expandible member, said disk coöperating with the valve stem to limit movement thereof in the outward direction.

2. A valve mechanism comprising a gage chamber to be secured to the valve stem of the tire, a tube removably secured to the chamber, an expandible member secured at its lower end to the chamber by said tube, a tubular valve member slidable in the tube and connected to the upper end of the expandible member, a valve in said valve member and including a stem, and means carried by the chamber to limit movement of said stem in the outward direction.

In witness whereof I have hereunto subscribed my name this 23rd day of March, 1917.

JOSEPH BUCHEK.